United States Patent [19]

Starr

[11] Patent Number: 4,711,149

[45] Date of Patent: Dec. 8, 1987

[54] ELECTRIC GUITAR PICKUP SWITCHING SYSTEM

[76] Inventor: Harvey W. Starr, 21668 Wohelo Trail, Chatsworth, Calif. 91311

[21] Appl. No.: 754,402

[22] Filed: Jul. 12, 1985

[51] Int. Cl.[4] ........................ G10H 3/18; G09B 15/02

[52] U.S. Cl. .................................... 84/1.16; 84/477 R

[58] Field of Search ........................ 84/1.15, 1.16, 454, 84/477 R, DIG. 18

[56] References Cited

U.S. PATENT DOCUMENTS 2,897,709 8/1959 McCarty et al. .................... 84/1.15

4,222,301 9/1980 Valdez ................................ 84/1.15

*Primary Examiner*—S. J. Witkowski

*Attorney, Agent, or Firm*—John E. Wagner

[57] ABSTRACT

The preferred embodiment relates to a musician operated electric guitar having a plurality of metal strings and at least two pickups for transforming mechanical vibrations of the metal strings into electrical signals proportional to such mechanical vibrations, where the electrical signals from the at least two pickups are added together into a single guitar output circuit. The preferred embodiment is an apparatus for facilitating the electrically quiet, one touch electrical switching in and out of the guitar output circuit selected combinations of the at least two pickups electrically switched in and electrically switched out of the guitar output circuit, comprising (1) a plurality of discrete switches; (2) an encoding means interconnected to each of the discrete switches for sensing which of the plurality of switches has been depressed and creating a plurality of distinct control signals, one distinct control signal for each discrete switch depressed; and, (3) a plurality of automatic switch means, each automatic switch means being interconnected to the encoding means and interconnected between one of the at least two pickups and the guitar output circuit for switching its pickup into and out of the guitar output circuit responsive to at least one of the distinct control signals received from the encoding means. The depression of each of the discrete switches thus causes a single combination of the at least two electrical signal sources electrically switched in and electrically switched out of the guitar output circuit to become so switched in and out.

11 Claims, 7 Drawing Figures

Vdd
U2a
U2b
U2c
LED 1
LED 2
LED 3
R1
R2
R3
14
32
34
35
36
26
40
Vss
C1
C2
C3
C4
U1
A
B
C
D
DA
KBM
OF
VSS
OSC
L
SW1
SW2
SW3
SW4
SW5
SW6
SW7
SW8
SIG.1
SIG.2
SIG.3
SIG.4
U2d
ON BD EFFECT 1
ON BD EFFECT 2
38
U1 ENCODER
ROW
COLUMN
16 SWITCHES IN MATRIX

TO PICKUP 1
TO PICKUP 2
TO PICKUP 3
TO AUX. SIGNAL SOURCE
U2a
U2b
U2c
U2d
LED 1
LED 2
LED 3
32
C3
C4
Vdd
U1 ENCODER
A
B
C
D
DA
KBM
OE
Vss
OSC
C1
C2
X1-4
SW1
SW2
SW3
SW4
SW5
SW6
SW7
SW8
SW9
SW10
SW11
SW12
SW13
SW14
SW15
SW16

440
30
L
SW7

ELECTRIC GUITAR PICKUP SWITCHING SYSTEM

BACKGROUND OF THE INVENTION

The present invention generally relates to electrical switching and more particularly to an electronic switching apparatus for electric guitars.

The quality electric guitar typically will have three pickups placed under six metal strings for transforming the mechanical vibrations of the metal strings into proportional analog signals. Each of the pickups are typically composed of a single coil of wire having two wires connectable to a guitar output circuit consisting of a shielded two conductor cable, which, in turn, is connected to an an audio amplifying device. The pickups are normally connected in parallel so that their analog signals are added together. The analog signals from the pickups are then amplified and projected at the audience via the audio amplifying device and speakers.

The pickup nearest to the string anchor of the electric guitar will only be able to pickup the high frequency components of the mechanical vibrations of the metal strings because the amplitude of the mechanical vibrations of the metal strings is reduced the closer a pickup is to the string anchor. The pickup furthest from the string anchor will, therefore, be able to pickup more of the low frequency components of the mechanical vibrations of the metal strings. The pickup located midway between the other two pickups will be able to pickup more of the midrange components of the mechanical vibrations of the metal strings.

Since each of the pickups are better able to pickup different frequency components of the mechanical vibrations of the metal strings, the musician frequently wishes to electrically switch in and out certain combinations of all of the pickups in order to produce different musical effects. This electrical switching must be done (1) quickly while playing the electric guitar, (2) substantially quietly (in an electrical noise sense) and (3) accurately so that the switching of the chosen combination of all of the pickups is visually and audibly unnoticeable to the audience.

Traditionally, a single one pole, 3-position switch is provided on electric guitars. This allows selection of one of three pickups, or, if the switch detents are defeated or altered, adjacent pairs of adjacent contacts may be bridged allowing selection of two pickups, namely 1 and 2, or 2 and 3. Combinations 1 and 3, and 1, 2, 3 (also all pickups off) are not available ordinarily, unless the guitar is rewired to accept three discrete ON/OFF switches (whose disadvantages are elaborated above.)

Prior to the present invention, the electric guitar has, in some cases, been provided with discrete switches, one for each pickup. Each of these discrete switches are hard wired into the pickup wiring and, in fact, are electrically connected in series with the wires coming from each of the pickups so that by manually flipping one of these switches, the musician can electrically switch one of the pickups in or out of the guitar output circuit.

There have been several very noticeable disadvantages inherent in these discrete hard wired switches. First, the switching of a chosen combination of pickups takes too much time because at many as three switches would have to be switched in order to obtain the desired combination of pickups. Second, because the musician is usually focusing his attention primarily on playing the metal strings, he is likely to throw the wrong switches when trying to switch in a desired combination, and, thus is often unable to obtain the desired musical effect during his performance. Third, the hard wired discrete switches place a very noticeble "click" (electrical transient signal) into the guitar output circuit each time a switch is switched ON or OFF. The audience is thus annoyed by loud "clicks" each time the musician wishes to change the combination of pickups. Fourth, the musician appears awkward and loses the continuity of his visual presentation when he is taking time out to clumsily switch three discrete switches several times during each song.

The same disadvantages described above as well as time delay also apply to the standard three or five position switches when switching from one extreme position to the opposite. Transients can occur when each switch position is passed.

The present invention has, to a great extent, done away with the disadvantages of the discrete hard wired switches by inventing an electronic switching apparatus which offers a single switch for each possible combination or a selection of combinations of pickups switched in and out of the guitar output circuit. In addition, the switching of the desired combination of pickups is also substantially free of electrical noise.

SUMMARY OF THE INVENTION

The present invention relates generally to a musician operated electric guitar having a plurality of metal strings and at least two pickups for transforming mechanical vibrations of the metal strings into electrical signals proportional to such mechanical vibrations, where each of the electrical signals from the at least two pickups are electrically added together into a single guitar output circuit. The preferred embodiment of the present invention is an apparatus for facilitating the electrically quiet, one touch electrical switching in and out of the guitar output circuit of selected combinations of the at least two pickups electrically switched in and electrically switched out of the guitar output circuit, comprising (1) a plurality of discrete switches; (2) an encoding means interconnected to each of the discrete switches for sensing which of the plurality of switches has been depressed and creating a plurality of distinct control signals, one distinct control signal for each discrete switch depressed; and (3) a plurality of automatic switch means, each automatic switch means being interconnected to the encoding means and interconnected between one of the at least two pickups and the guitar output circuit for switching its pickup into and out of the guitar output circuit responsive to at least one of the distinct control signals received from the encoding means. The depression of each of the discrete switches thus causes a single combination of the at least two pickups electrically switched in and electrically switched out of the guitar output circuit. The apparatus of the preferred embodiment thus provides the musician with one touch control and electrically quiet switching of selected combinations of the at least two pickups electrically switched in and electrically switched out of the guitar output circuit.

The apparatus of the preferred embodiment further includes means for visually indicating which of the selected combinations of the at least two pickups are currently switched in and out of the guitar output circuit.

DETAILED DESCRIPTION OF THE INVENTION

Figure 1:
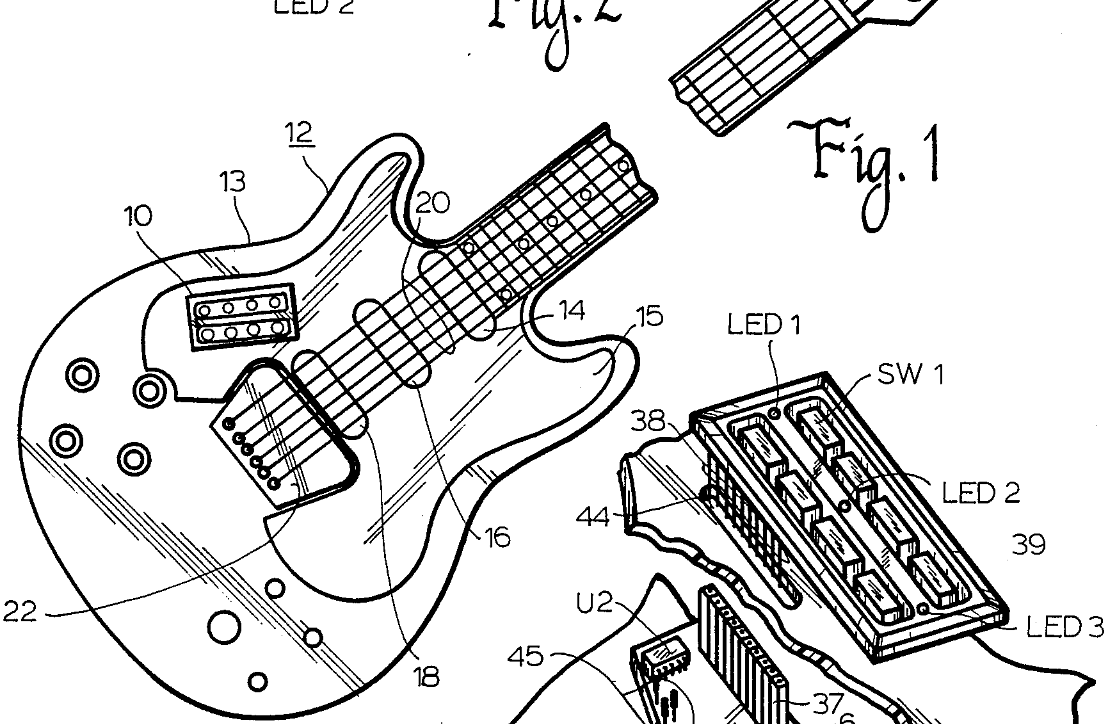
FIG. 1 is a perspective view of an electric guitar with the preferred embodiment of the present invention installed therein.

Referring to FIG. 1, the typical electric guitar 12 is shown with the preferred embodiment of the electronic switching apparatus 10 of the present invention installed therein. The quality electric guitar 12 typically will have three pickups 14, 16, and 18 placed under six metal strings 20 for transforming the mechanical vibrations of the metal strings 20 into proportional analog signals. Each of the pickups 14, 16, and 18 are typically composed of a single coil of wire (unshown) having two output wires (unshown) connectable to a guitar output circuit (32 of FIGS. 3 and 4) consisting of a shielded two conductor cable (unshown), which, in turn, is connected to an an audio amplifying device (unshown). The pickups 14, 16 and 18 are normally connected in parallel so that their analog signals are added together. The analog signals from the pickups 14, 16, and 18 are then amplified and projected at the audience via the audio amplifying device and speakers (unshown).

Pickup 18 is the nearest of pickups 14, 16 and 18 to string anchor 22, which anchors the metal strings 20 the the electric guitar 12. Pickup 18 will only be able to pickup the higher frequency components of the mechanical vibrations of the metal strings 20 because the amplitude of the mechanical vibrations of the metal strings 20 is reduced the closer a pickup is to the string anchor 22. Pickup 14 is the furthest from string anchor 22 and will, therefore, be able to pickup more of the low frequency components of the mechanical vibrations of the metal strings 20. Pickup 16 is located midway between pickups 18 and 14 and, therefore, will be able to pickup more of the midrange components of the mechanical vibrations of the metal strings 20.

Since each of the pickups 14, 16 and 18 are better able to pickup different frequency components of the mechanical vibrations of the metal strings 20, the musician frequently wishes to electrically switch in and out certain combinations of the pickups 14, 16 and 18 in order to produce different musical effects. This electrical switching must be done (1) quickly while playing the electric guitar 12, (2) substantially quietly (in an electrical noise sense) and (3) accurately, so that the switching of the chosen combination of pickups 14, 16 and 18 is visually and audibly unnoticeable to the audience.

Prior to the present invention, the electric guitar 12 has been provided with discrete switches (unshown), one for each pickup 14, 16 and 18. Each of these discrete switches are hard-wired into the pickup wiring and, in fact, are electrically connected in series with the wires coming from each of the pickups 14, 16 and 18 so that by manually flipping one of these switches, the musician can electrically switch in or out of the guitar output circuit 32 (FIGS. 3 and 4) one of the pickups 14, 16 and 18. There have been several very noticeable disadvantages inherent in these discrete hard wired switches. First, the switching of a chosen combination of pickups takes too much time because as many as three switches would have to be switched in order to obtain the desired combination of pickups. Second, because the musician is usually focusing his attention primarily on playing the metal strings, he is likely to throw the wrong switches when trying to switch in a desire combination, and, thus is often unable to obtain the desired musical effect during his performance. Third, the hard wired discrete switches place a very noticeable "click" (electrical transient signal) into the guitar output circuit each time a switch is switched ON or OFF. The audience is thus annoyed by loud "clicks" each time the musician wishes to change the combination of pickups. Fourth, the musician appears awkward and loses the continuity of his visual presentation when he is taking time out to clumsily switch three discrete switches several times during each song.

The same disadvantages described above as well as time delay also apply to the standard three or five position switches when switching from one extreme position to the opposite. Transients can occur when each switch position is passed.

Figure 2:
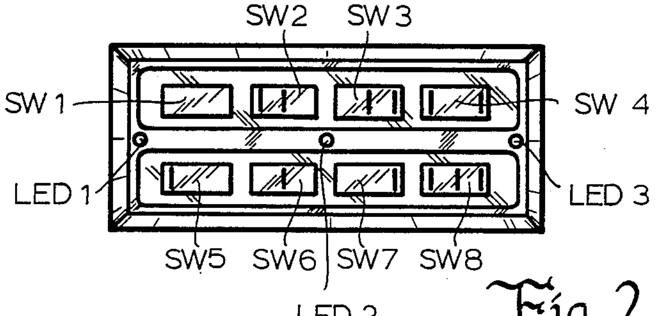
FIG. 2 is an elevational view of the keyboard of the preferred embodiment of the present invention.

The present invention has, to a great extent, done away with the disadvantages of the discrete hard wired switches by inventing an electronic switching apparatus which offers a single switch for each possible combination or a selection of combinations of pickups switched in and out of the guitar output circuit. In addition, the switching of the desired combination of pickups is also substantially free of electrical noise. The player may operate any switch (SW1 through SW8 of FIG. 2) at any time. For reasons which will be subsequently disussed, the switching of the desired combination of pickups 14, 16 and 18 is also substantially free of electrical noise. As shown in FIG. 2, the eight switches SW1–SW8 are marked to show the active pickups, for example:

| | |
|---|---|
| SW1 | None |
| SW2 | 1 + 2 |
| SW3 | 2 + 3 |
| SW4 | 1 + 3 |
| SW5 | 1 only |
| SW6 | 2 only |
| SW7 | 3 only |
| SW8 | All. |

LEDs 1–3 (light emitting diodes) are associated with respective pickups 14, 16 and 18, and are illuminated when each corresponding pickup is active. The player selects the active pickups by pressing the appropriate switch to select the combination of pickups desired. The LEDs 1–3 give the player visual indication of the active pickups.

Figures 3, 5:
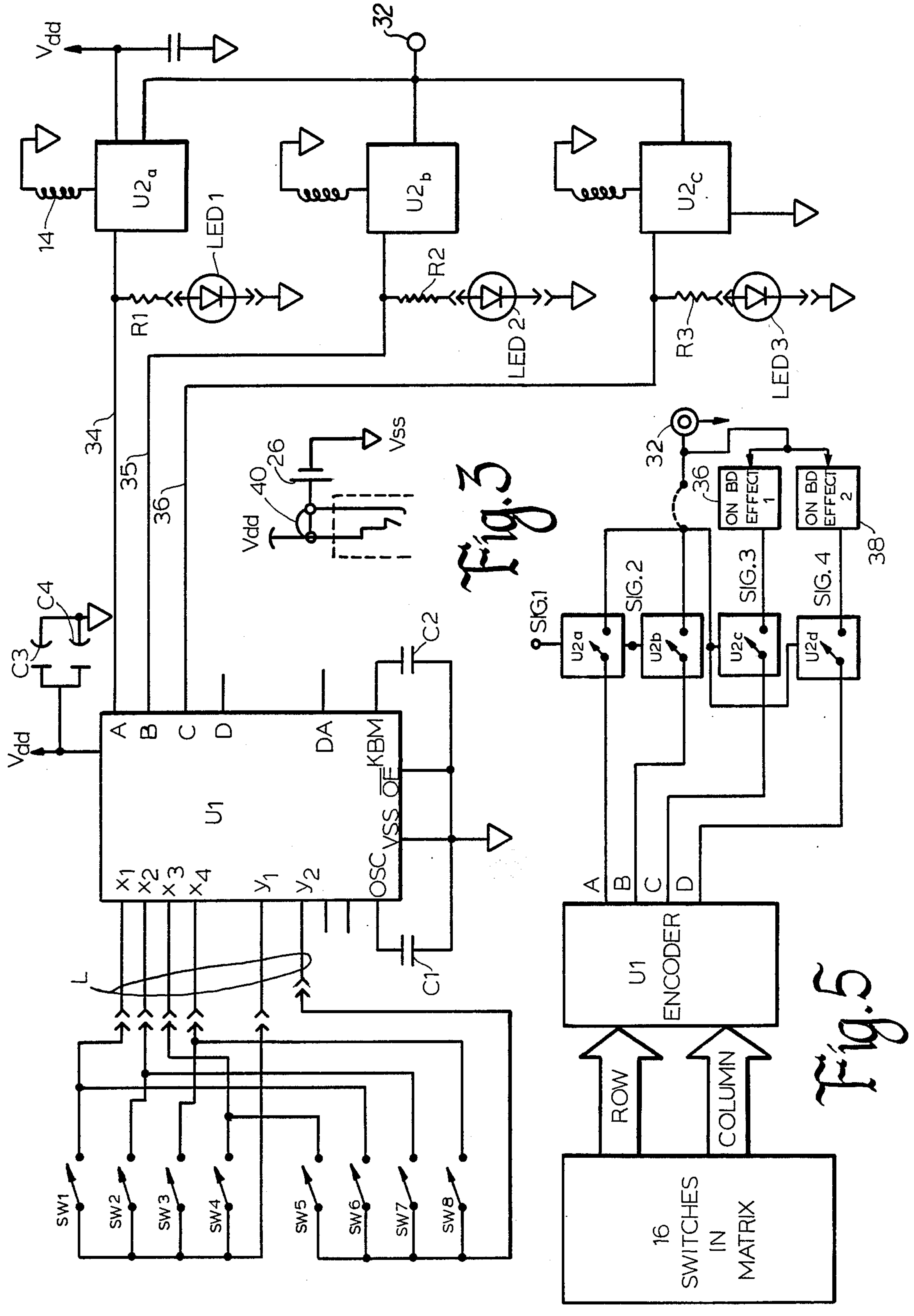
FIG. 3 is a detailed electronic schematic diagram of the preferred embodiment of the present invention.
FIG. 5 is an electronic block diagram of the alternate embodiment showing the switching of on board effects.

Referring now to FIG. 3, the preferred embodiment of the electronic switching apparatus 10 of the present invention is shown. Preferably, a 74C922 16 key encoder integrated circuit U1 (manufactured by National Semiconductor) is used to strobe the row and column inputs which are connected as shown to switches SW1 through SW8. Switches SW1 through SW8 are preferably push switches offering only a momentary contact which will be sensed by encoder U1 when it strobes its input lines L. When a particular switch SW1 through SW8 is momentarily depressed, the encoder U1 senses this condition and produces a distinct control signal composed of digital highs and lows at its DATA OUT A through D outputs. When DATA OUT A line of encoder U1 goes high, automatic switch means U1a (which is one-quarter of a 4066 quad bilateral switch) causes pickup 14 to become electrically connected to guitar output circuit terminal 32. Since the other wire of pickup 14 is connected to ground, when DATA OUT A line of encoder U1 goes high, pickup 14 is connected to the guitar output circuit 32 through switch U2*a*.

Each of the automatic switch means U2*a* through U2*c* are extremely quite in their switching (in an electrical sense). In fact, any switching noise is practically undetectable even after the signals flowing through the guitar output circuit 32 are multiplied many times.

In addition, LED1 is lighted when DATA OUT A line from encoder U1 goes high, thus, visually indicating to the musician that pickup 14 is connected in the guitar output circuit 32. Capacitor C1 has been chosen to have a value of 0.001 microfarad in order to require encoder U1's strobing to be at a relatively high frequency of 100 kiloHertz in order to prevent the guitar output circuit 32 from picking up audio frequency strobe signals. Since the electronic switching apparatus 10 is preferably mobile, it is preferably provided power by a standard 9 volt battery 26 as shown in FIG. 3.

U2*b* and U2*c*, light emitting diodes LED2 and LED3 and resistors R2 and R3 operate the same as U2*a*, LED1 and R1 when their respective control lines 34, 35 and 36 are made high by encoder U1. Thus, each combination of possible electrically switched in and electrically switched out pickups 14, 16 and 18 are accomplished by this embodiment of the present invention.

Battery 26 which powers this switching system has its negative terminal connected to system ground $V_{ss}$ and its positive terminal connected via bridge 40 to the operating circuit elements via lead $V_{dd}$. A conventional ¼ inch stereo jack is used to transmit audio through one set of leads and the second set may be used to automatically power this circuit when the mating plug is inserted and the bridge 40 has been cut. When the bridge 40 is uncut, the circuit is always powered but the only signal drain is when one or more LEDs 1–3 are illuminated.

Figures 4, 6:
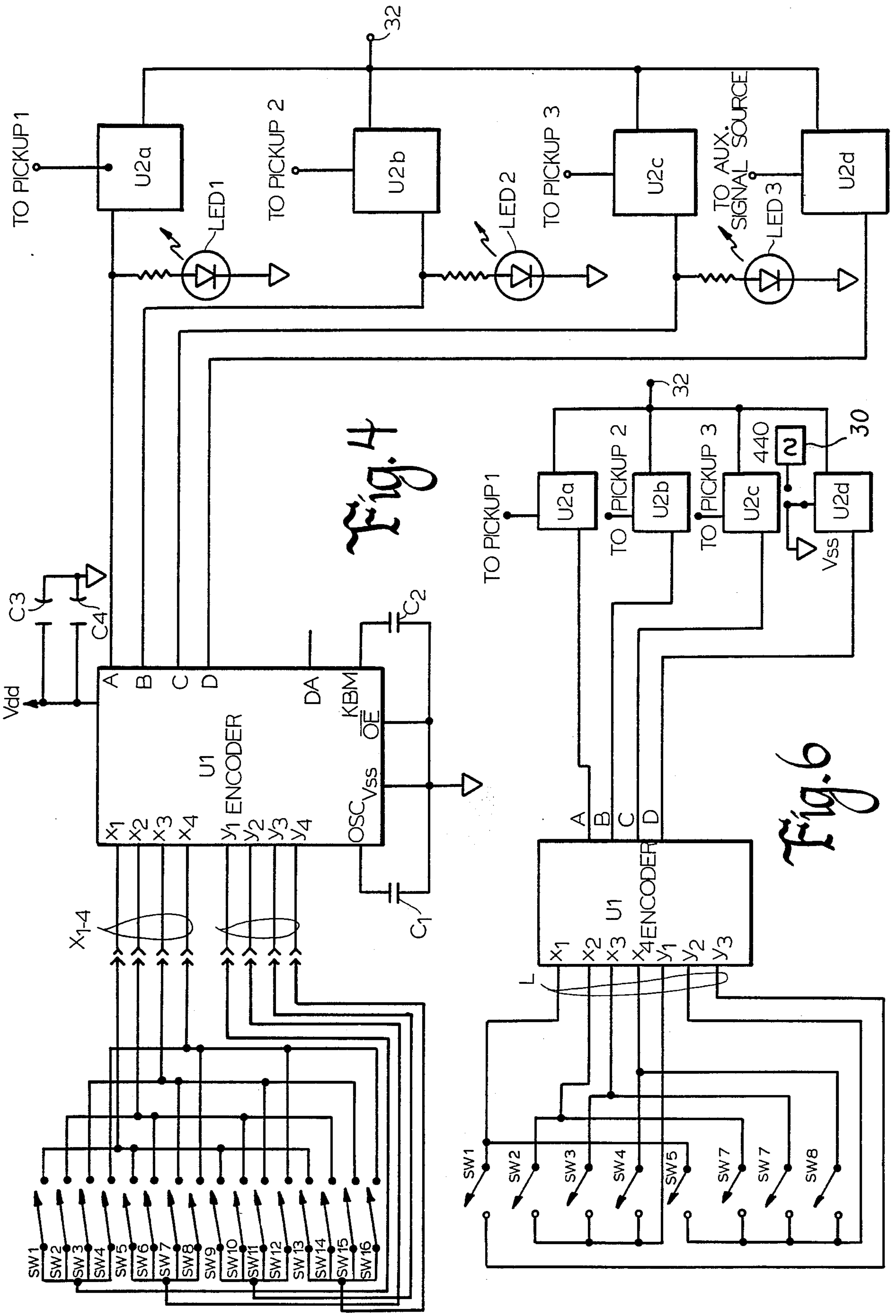
FIG. 4 is a detailed electronic schematic diagram of the alternate embodiment of the present invention.
FIG. 6 is a block diagram of an alternate embodiment of this invention providing improved isolation between the guitar strings and circuitry and the output circuit.

Referring to FIG. 4, an alternate embodiment of the electronic switching apparatus 10 of the present invention is shown. This embodiment is similar to that shown in FIG. 3, however, encoder U1 has sixteen switches SW1–SW16 (also push switches for momentary contact) wired to encoder U1 in a matrix fashion as illustrated in FIG. 4. Each of encoder U1's four control lines A through D are connected to one of the automatic switch means U2*a* through U2*d*. In this embodiment, each of four signal sources of any type (including pickups 14, 16 and 18) are connected in series with automatic switch means U2*a*–U2*d* and the guitar output circuit terminal 32. One of these signal sources may be an oscillator 30 (of any standard design) producing a 440 Hertz sine wave for tuning the electric guitar 12.

Referring to FIG. 5, a further use of the alternate embodiment (FIG. 4) is shown in block diagram form. U2*a* and U2*b* are still switching signal sources #1 and #2, respectively, in and out of the guitar output circuit 32. U2*c* and U2*d* still switch in and out signal sources #3 and #4, respectively, where signal sources #3 and #4 come from on board effect No. 1 (36) and on board effect No. 2 (38), respectively. On board effect No. 1 (36) and on board effect No. 2 (38) can be carried aboard electric guitar 12 and are signal sources added into the guitar output circuit terminal 32. However, on board effects Nos. 1 and 2 (36 and 38) are distinctive in that they each obtain original signals from guitar output circuit 32 and modify these original signals and add the modified signals back into the guitar output circuit 32.

There are numerous on board effects which are well known in the electric guitar field which could be used for on board effects Nos. 1 and 2 (36 and 38). A short list of some possible on board effects which could be switched by the electronic switching apparatus 10 of the present invention is as follows:

1. Phase shifter

This circuit uses a repetitive phase shifting of the audio signal from the guitar output circuit 32, and the rate of phase shifting can be varied.

2. Harmonic Equalization

This circuit suppresses the primary signal from the metal strings 20 and boost harmonics therefrom. Typically it consists of a notch filter arrangement where the notch is in the range of primary frequencies from the metal strings 20.

3. "Fuzz Box"

This circuit is essentially an overdriven amplifier which causes clipping of the higher amplitudes of the audio signal from the guitar output circuit 32 to produce rich harmonics.

4. Note Sustaining Circuit

This circuit keeps the notes from the metal strings 20 continuing at a fixed amplitude even after the vibrations have started to decay. This is done by what is essentially an automatic gain control circuit which adjusts the gain of an amplifier to compensate for the loss of the original note as it decays.

5. Echo

This circuit is created with a tape recorder which has simultaneously operating record and play head placed in different places along the travel of a circular magnetic tape. The original audio signal from the guitar output circuit 32 is recorded on the tape, and the offset play head after a short delay plays this same audio signal back into the guitar output circuit 32.

6. Tremolo

This circuit is one which continuously varies the intensity of the audio signal from the guitar output circuit 32 over a range of intensities but at a fixed but variable rate.

Thus, the alternate embodiment of FIGS. 4 and 5 offer the musician one touch and quiet switching of each possible combination of four signal sources and/or on board effects which will be added into the guitar output circuit 32.

Of course, in either the preferred or alternate embodiments of the present invention, there may be less switches (SW1–SW6) than necessary to provide each possible combination of pickups 14, 16 and 18, signal sources and/or on board effects. For instance, a musician may prefer to have only certain selected combinations at his control. These selected combinations would then be the ones for which switches (SW1–SW16) would be provided.

Referring to FIG. 6, identical components bear the same designation as in FIG. 3. The bottom additional CMOS switch element (U2-*d*) connects the guitar amplifier output terminal 32 to the switch system ground $V_{ss}$. Whenever lead D from U1 encoder is high, U2d shorts the terminal 32 and the assembled amplifier input to ground. The three pickup sources are turned off but only signal voltages present on the pickup leads and passing through open switches U2*d*-*c* are grounded by U2*d*. This isolates the guitar electrically from the amplifier.

Figure 7:
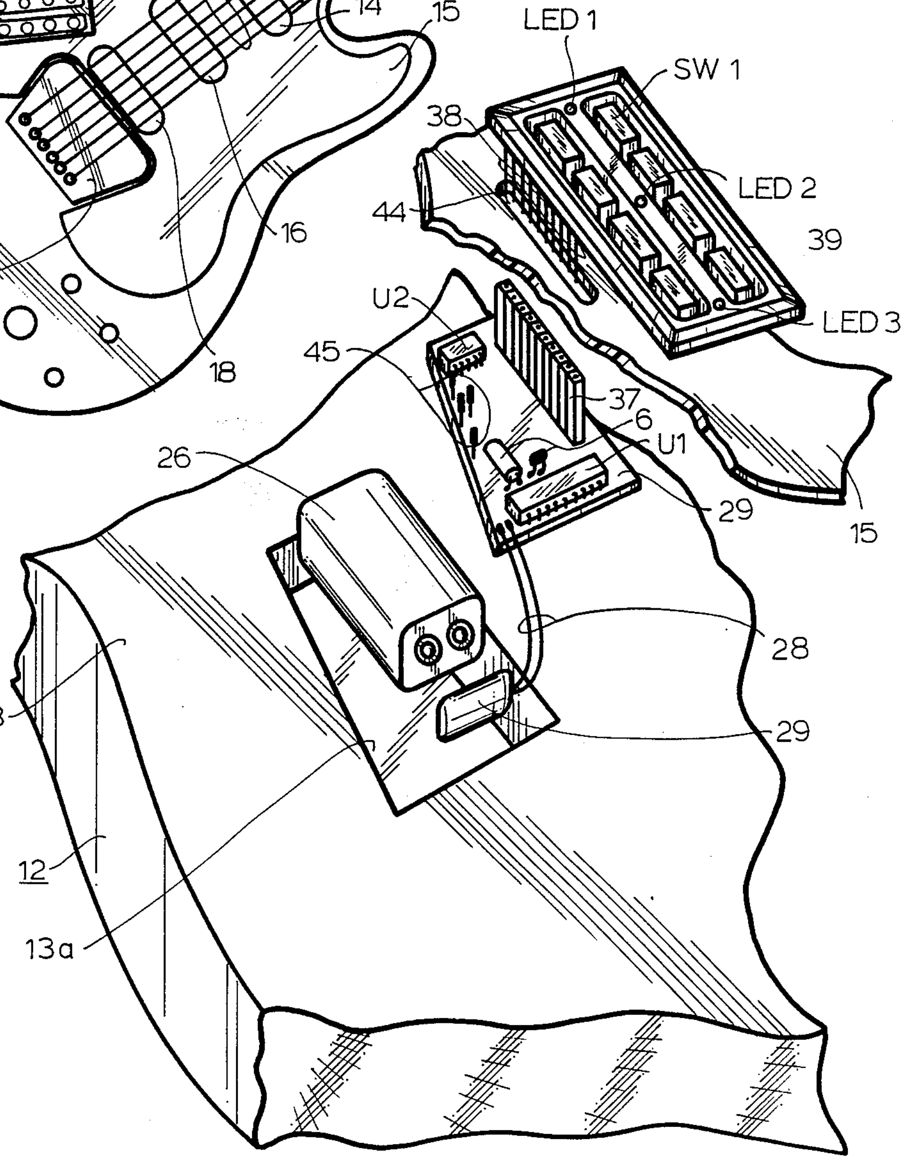
FIG. 7 is an exploded view showing this invention as it is assembled into a solid body guitar.

The ultimate simplicity of this invention and its compatibility with conventional solid body electric guitars is illustrated in FIG. 7. Illustrated in FIG. 1 are guitars such as a Fender Stratocaster or an Ovation solid body guitar having a body 13 of wood and a thin plastic pickguard 15 overlying the wood body in the playing region.

Referring now to FIG. 7, the body 13 has a number of recesses, one of which 13*a* appears in FIG. 7. The recess 13*a* normally houses a three position mechanical switch of the type described in the background section of this application. The mechanical switch has been removed and replaced with this invention. It includes the battery 26 with its terminals connected via terminal tab 27 and leads 28 to a printed circuit board 29. The printed circuit board 29 carries the electronic integrated circuits U1 and U2 as well as other components such as capacitor C. An upstanding jack assembly 37 is designed to receive terminal pins 38 from the switch assembly 39. The pins 38 pass through an elongated slot 44 which formerly received the operator arm of the three position mechanical switch which has been removed. The switch plate 39 carries the switches SW1-8 and LEDs 1-3 and may be secured to pick guard by an adhesive.

It is apparent that this invention is self contained and may be easily installed by a guitar maker or by the player himself who need only connect the input leads previously connected to the mechanical switch to the terminals 45, plug the battery 26 into its terminal 27, drop the printed circuit board 29 into the recess 13*a* and position the switch assembly 39 on the pick guard 15 with its terminal pins 30 extending through slot 44 and into multiple jack 37.

The pick guard 15 is then reassembled on the guitar body 13 and the guitar is ready to be played with versatility unknown before this invention.

The above described embodiments of the present invention are merely descriptive of its principles and are not to be considered limiting. The scope of the present invention instead shall be determined from the scope of the following claims, including their equivalents.

I claim:

1. In a musician operated electric guitar having a plurality of metal strings and at least two pickups for transforming mechanical vibrations of the metal strings into electrical signals proportional to such mechanical vibrations, where each of the electrical signals from the at least two pickups are electrically added together into a single guitar output circuit, an apparatus for facilitating the electrically quiet, one touch electrical switching in and out of the guitar output circuit of selected combinations of the at least two pickups electrically switched in and electrically switched out of the guitar output circuit, comprising:

a plurality of discrete switches;

an encoding means interconnected to each of the discrete switches for sensing which of the plurality of switches has been depressed and creating a plurality of distinct control signals, one distinct control signal for each discrete switch depressed;

a plurality of automatic switch means, each automatic switch means being interconnected to the encoding means and interconnected between one of the at least two pickups and the guitar output circuit for electrically quiet switching of its pickup into and out of the guitar output circuit responsive to at least one of the distinct control signals received from the encoding means;

the depression of each of the discrete switches thus causing a single combination of the at least two pickups electrically switched in and electrically switched out of the guitar output circuit to become so switched in and out; and, the apparatus thus providing the musician with one touch control and electrically quiet switching of selected combinations of the at least two pickups electrically switched in and electrically switched out of the guitar output circuit.

2. The apparatus in accordance with claim 1 further including means for visually indicating which of the selected combinations of the at least two pickups are currently switched in and out of the guitar output circuit.

3. In a musician operated electric guitar having a plurality of metal strings and at least one pickup for transforming mechanical vibrations of the metal strings into electrical signals proportional to such mechanical vibrations, where the electric signals from the at least one pickup are transmitted into a guitar output circuit, an apparatus for facilitating the electrically quiet, one touch electrical switching in and out of the guitar output circuit selected combinations of at least two electrical signal sources, one of which is said at least one pickup, electrically switched in and electrically switched out of the guitar output circuit, comprising:

a plurality of descrite switches;

an encoding means interconnected to each of the descrete switches for sensing which of the plurality of switches has been depressed and creating a plurality of distinct control signals, one distinct control signal for each descrete switch depressed;

a plurality of automatic switch means, each automatic switch means being interconnected to the encoding means and interconnected between one of the at least two electrical signal sources and the guitar output circuit for switching its electrical signal source into and out of the guitar output circuit responsive to at least one of the distinct control signals received from the encoding means;

the depression of each of the descrete switches thus causing a single combination of the at least two electrical signal sources electrically switched in and electrically switched out of the guitar output circuit to become so switched in and out; and the apparatus thus providing the musician with one touch control and substantially quiet switching of selected combinations of the at least two electrical signal sources electrically switched in and electrically switched out of the guitar output circuit.

4. The apparatus in accordance with claim 3 further including means for visually indicating which of the selected combinations of the at least two electrical signal sources are currently switched in and out of the guitar output circuit.

5. The apparatus in accordance with claim 3 in which one of the electrical signal sources provides a 440 Hertz sine wave analog signal for tuning the guitar.

6. The apparatus in accordance with claim 3 in which at least one of the electrical signal sources obtains a signal from the guitar output circuit, modifies this signal and offers the modified signal to its automatic switch means for switching in and out of the guitar output circuit.

7. A switching assembly for an electric guitar having at least two pickups and an output circuit for substituting different electrical pickups of the electric guitar into the output circuit of the electrical guitar comprising:

a plurality of manually operated electrical switches, one for each desired combination of pickups to be connected at any one time to the output circuit of the electric guitar;

electrical signal combining means connectable to each of said plurality of manually operated switches and the electrical pickups of said guitar and to said output circuit; and indicator means controlled by said manually operated switches for indicating which of the electrical pickups of said guitar are connected to the output circuit of said guitar.

8. An electric guitar switching assembly in accordance with claim 7 in which said electrical signal combining means includes a plurality of electrically operated switches having their outputs connected to the output circuit of said electric guitar and their inputs connected to respective signal pickups of said guitar.

9. An electric guitar switching assembly in accordance with claim 7 including encoding means responsive to said manually controlled switches for enabling said combining means responsive to the operation of said manually controlled switches.

10. The combination in accordance with claim 8 wherein the guitar includes three electrical pickups and said manually operated switches number eight whereby said assembly provides the following combination of pickups operatively coupled to the output of said guitar:

all pickups OFF
first pickup only
second pickup only
third pickup only
all pickups ON
first and second pickups
second and third pickups
first and third pickups.

11. The assembly in accordance with claim 7 in which said guitar has a body with a cavity and a slot opening therethrough including a power source for said assembly positionable within said cavity, said combining means positioned within said cavity, said manually operated electrical switches positioned on said guitar body overlying said slot opening and electrical connector means extending through said slot opening and electrically connecting said assembly for operation.

* * * * *